Dec. 8, 1959    F. E. BOOTH, JR., ET AL    2,915,896
TORSIOGRAPH

Filed Dec. 1, 1955    5 Sheets-Sheet 1

INVENTORS
FREDERICK E. BOOTH, JR.
ROBERT B. COLTEN
GLENN E. WANTYAJA
BY D. L. DeMatt
ATTORNEY INVENTORS
FREDERICK E. BOOTH, JR.
ROBERT B. COLTEN
GLENN E. WANTTAJA
BY H. L. DeMott
ATTORNEY

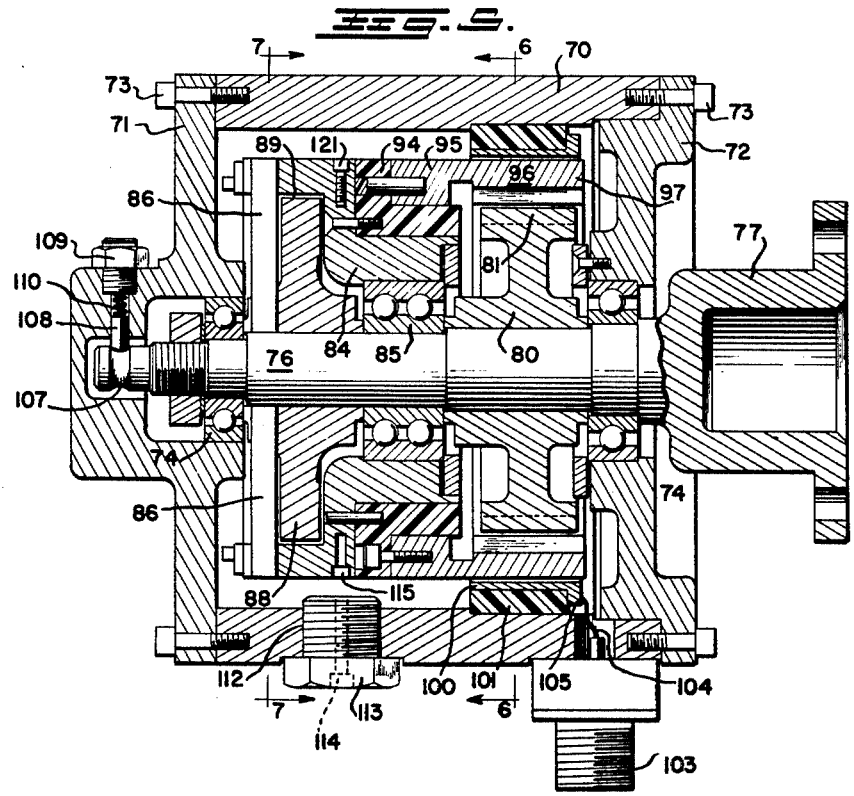
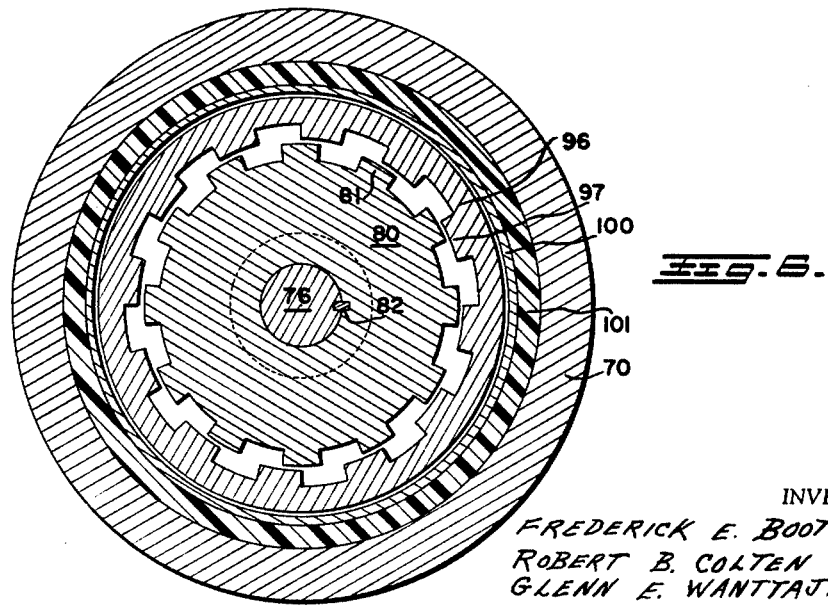

Dec. 8, 1959   F. E. BOOTH, JR., ET AL   2,915,896
TORSIOGRAPH
Filed Dec. 1, 1955   5 Sheets-Sheet 4
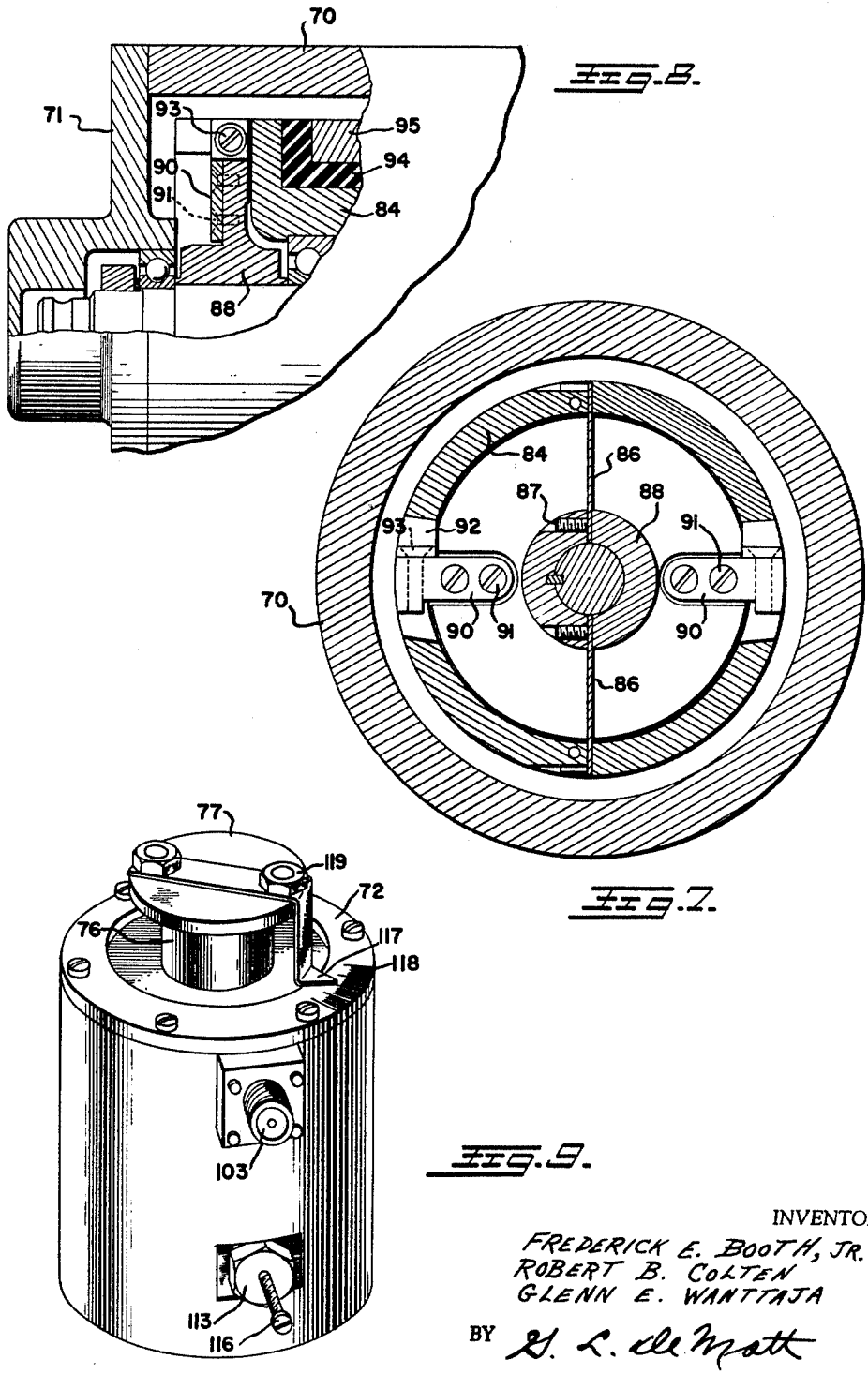
INVENTORS
FREDERICK E. BOOTH, JR.
ROBERT B. COLTEN
GLENN E. WANTTAJA
BY H. L. deMott
ATTORNEY

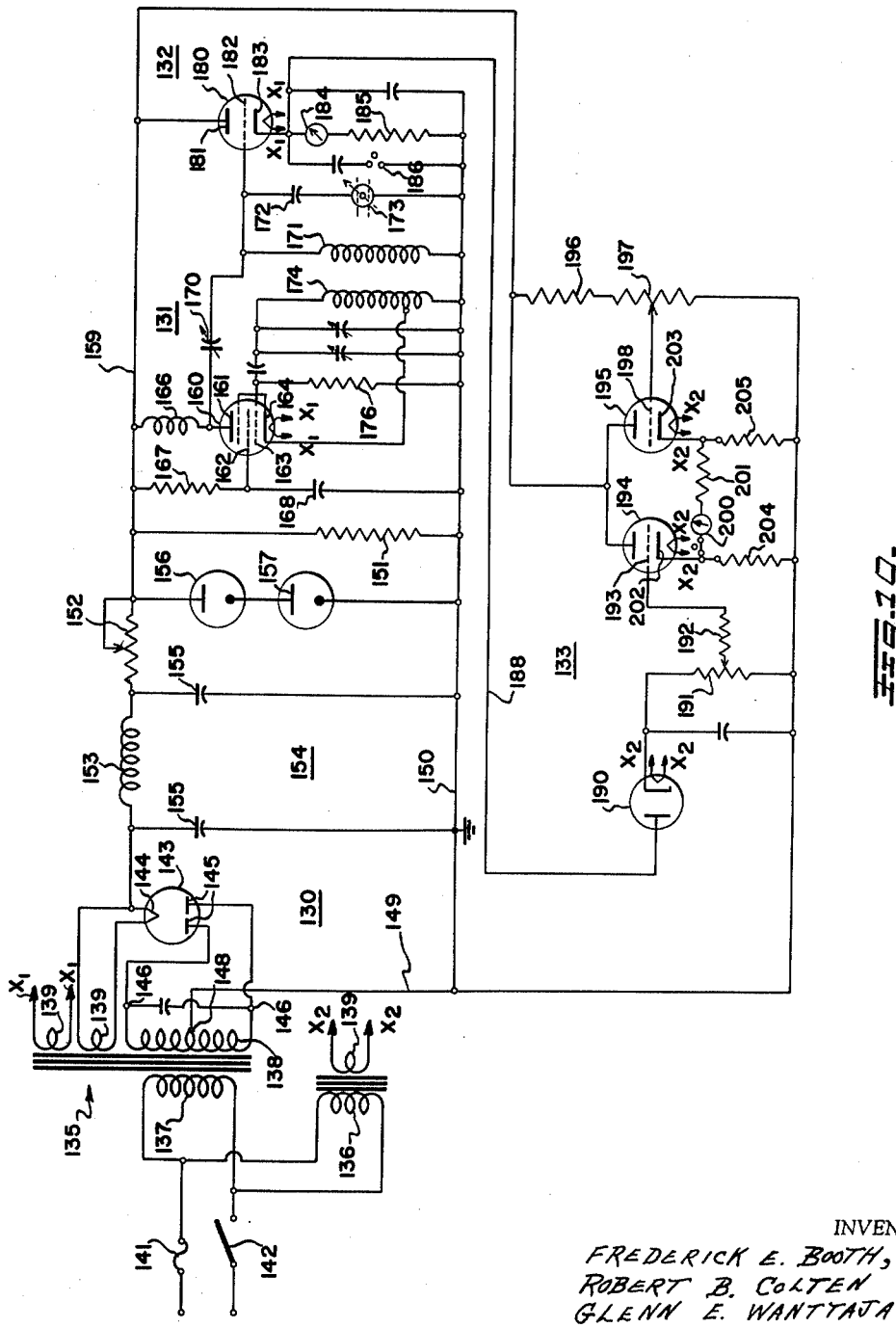

United States Patent Office 2,915,896
Patented Dec. 8, 1959

2,915,896

TORSIOGRAPH

Frederick E. Booth, Jr., Birmingham, Glenn E. Wanttaja, Royal Oak, and Robert B. Colten, Oak Park, Mich., assignors to General Motors Corporation, Detroit, Mich., a corporation of Delaware Application December 1, 1955, Serial No. 550,257

10 Claims. (Cl. 73—70.1)

The present invention generally relates to means for measuring the torsional vibration on a rotating member, and more particularly relates to torsiographs of the electrostatic seismic mass type wherein relative displacement between the seismic or high inertia mass and the rotating member due to torsional vibration is determined as a measure of variance in electrical capacity.

Torsional vibration measurement is not a new problem, and seismic mass type torsiographs for measuring torsional vibration have previously been developed. The prior art devices have, however, had certain inherent limitations. One objection to their use in certain applications is their sensitivity to vibrations other than torsional vibrations. In addition, they are generally excessively responsive to non-recurrent vibrations which tend to mask the particular torsional vibrations under investigation. Finally, in both the electromagnetic and the electrostatic type of seismic mass torsiographs slip rings have been employed to transfer the variations in the electromagnetic field or electrostatic charges to metering apparatus. The employment of slip rings or other direct contacting pick-off arrangements has limited the use of seismic torsiographs when the vibrations under investigation have been of the lower frequency recurring type due to the frictional drag introduced by these direct contacting pick-offs at the lower vibrational frequencies.

It is a principal object of the present invention to provide an electrostatic device of an improved and simplified character wherein torsional vibrations in a rotating member produce angular displacements to a proportional degree in the opposed plates of a variable capacitor; wherein the displacements are independent of vibrations other than torsional vibrations; and wherein the displacements are generally independent of non-recurrent vibrations. In addition, it is desired to increase the sensitivity of the torsiograph by eliminating any direct coupling between the capacitor plates of the device and suitable electronic metering circuits.

A further object of the present invention is to provide novel means for statically calibrating a torsiograph whereby the relative angular displacement of a member under test may be correlated with the electrical capacity of the torsiograph for such displacement.

In accordance with the present invention, a torsiograph is provided with a member rigidly secured to a rotatable shaft and carrying a plurality of capacitor plates. A seismic member or high inertia mass is resiliently secured to the shaft and provided with capacitor plates that coact with those of the first member. A capacitor pick-off plate is mounted circumferentially with respect to the previously referred to capacitor plates to provide a non-contacting pick-off for the variations in capacity of the plates caused by torsional vibrations.

In a preferred embodiment of the invention, for purposes of calibration, the high inertia mass may be keyed or locked to the torsiograph casing in which the shaft is supported. Accordingly, the shaft may be manually rotated relative to the high inertia mass, and signals proportional to the relative displacement between the shaft and the mass may be correlated with markings or indicia in angular degrees provided on an end plate of the casing. Further, in accordance with the preferred embodiment of the invention, the high inertia mass is resiliently secured to the shaft through a viscous damping means whereby non-recurring vibrations are transmitted to the high inertia mass to prevent relative rotation between the mass and the shaft and thereby prevent the occurrence of signals other than those desired.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figure 5 is a vertical-sectional view of a preferred embodiment of the present invention;

Figure 6 is a cross-sectional view taken along the lines 6—6 of Figure 5;

Figure 7 is a cross-sectional view taken along the lines 7—7 of Figure 5;

Figure 8 is a partial sectional plan view of Figure 5 illustrating the connection between seismic mass stops and a viscous damping plate;

Figure 9 is a perspective view of the torsiograph of the present invention arranged for static calibration in accordance with the present invention; and Figure 10 is a schematic circuit diagram of metering apparatus particularly adapted for use with the torsiograph of the present invention.

Figure 1:
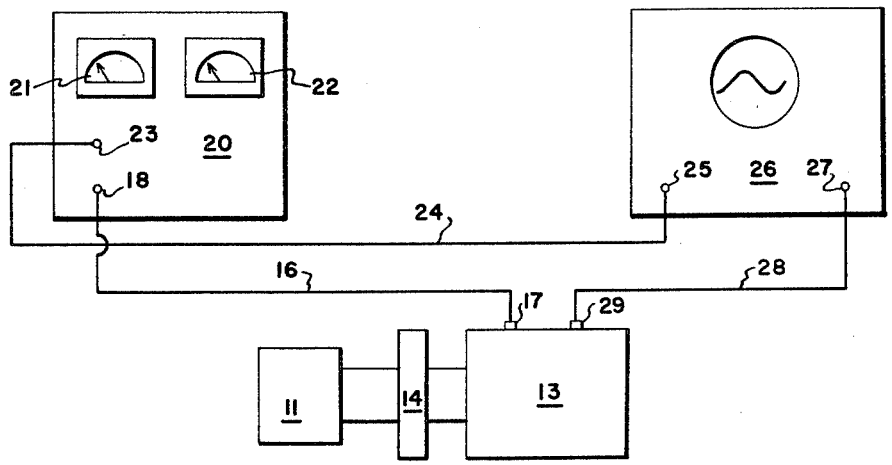
Figure 1 is a block diagram of torsional vibration test set up employing the torsiograph of the present invention.

Referring now to Figure 1, the test set-up for measuring the torsional vibrations in a rotating member 11 which may, for example, constitute the crank shaft of an internal combustion engine includes a torsiograph 13 of the present invention to be more fully described hereinafter. The torsiograph 13 is coupled through an adaptor 14 to the shaft 11. An electrical conductor or cable 16 connects the variable capacity output terminal 17 of the torsiograph to the input terminal 18 of electronic metering apparatus 20. The metering apparatus to be described later includes a direct current (D.C.) milliammeter 21 for indicating the average value of torsional vibrations in terms of D.C. milliamperes and a D.C. microammeter 22 indicating the peak value of torsional vibration in terms of angular degrees of relative shaft rotation. The output terminal 23 of the metering apparatus 20 is electrically connected through cable 24 to the vertical deflection input terminal 25 of a conventional oscilloscope 26. The horizontal deflection terminal 27 of the oscilloscope is connected through cable 28 to the synchronizing pulse output terminal 29 of the torsiograph. From this latter terminal electrical impulses are derived for every complete rotation of the shaft 11 and initiate the horizontal sweep of the oscilloscope. Accordingly, the horizontal sweep of the oscilloscope 26 may be calibrated in terms of angular degrees of rotation of a reference point on the shaft 11, and vertical deflection of the oscilloscope will occur at points on the sweep corresponding to points on the shaft 11 at which torsional vibrations occur during the rotation of the shaft with respect to the reference point.

If it is desired to determine only the average and peak values of torsional vibrations, the oscilloscope 26 and associated connections 24 and 28 may be omitted from the set-up, and the torsiograph 13 and metering apparatus 20 will still comprise a complete arrangement for ascertaining such values.

Figure 2:
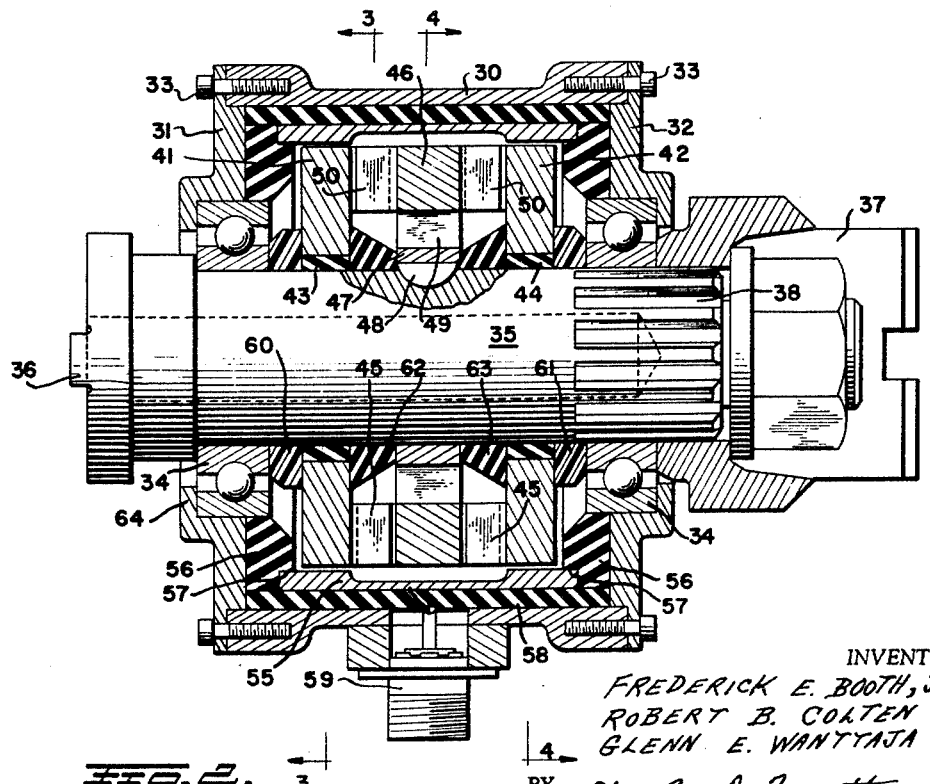
Figure 2 is a vertical sectional view of one embodiment of a torsiograph in accordance with the present invention.
Figure 3:
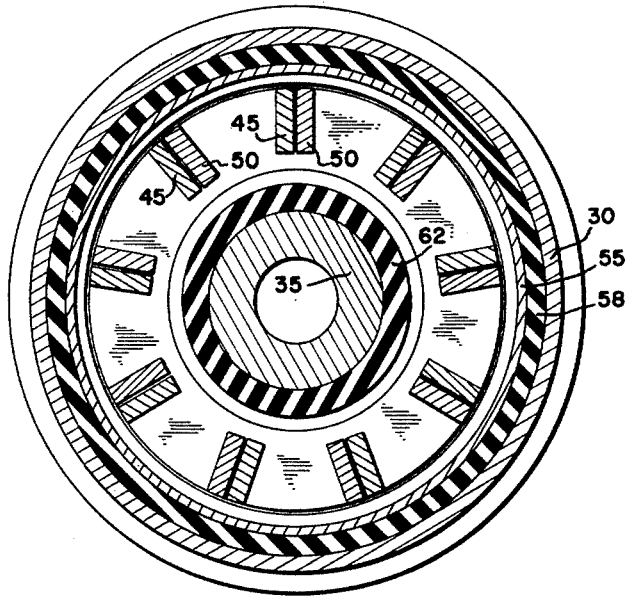
Figure 3 is a cross-sectional view taken along the lines 3—3 of Figure 2.
Figure 4:
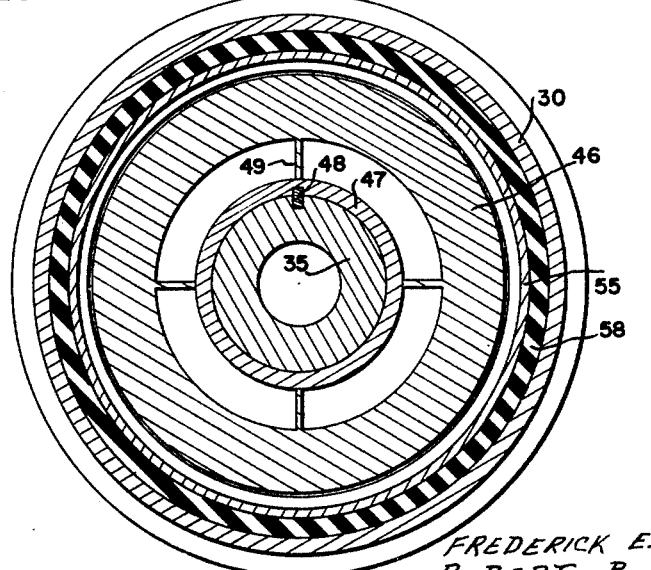
Figure 4 is a cross-sectional view taken along the lines 4—4 of Figure 2.

Referring now to Figures 2, 3, and 4, one form of the torsiograph of the present invention includes a generally cylindrical casing 30 having end plates 31 and 32 secured thereto by a plurality of circumferentially spaced screws 33. Antifriction bearings 34 secured within shoulders on the end plates support a shaft 35 for axial rotation within the casing. The shaft has a first coupler or adaptor 36 formed integral with the shaft and a second adaptor 37 splined to the shaft as at 38. The adaptors 36 and 37 extend beyond either side of the casing and provide means for coupling the torsiograph to a rotatable member under test. A first electrically conductive annular member 41 and a second electrically conductive annular member 42 are rigidly secured to but insulated from the shaft 35 through insulating rings 43 and 44. The members 41 and 42 are provided with a plurality of inwardly extending rectangular fingers or capacitor plates 45 that are equally circumferentially spaced adjacent the outer periphery of the members 41 and 42. Intermediate the members 41 and 42 an annular seismic or high inertia mass 46 of conducting material is resiliently secured to the shaft 35. The resilient securing means includes a ring 47 that is keyed to the shaft at 48, and provided with diametrically opposed flexible ribs or extensions 49 which may be formed integral with the seismic mass. The mass 46 is provided with outwardly extending rectangular plates 50 on each side of its surface adjacent its outer peripheral edge. The plates 45 and the plates 50 are in electrical capacitive relationship to each other and constitute the opposed conductive surfaces of a variable electrical capacitor. It is noted that the plates 45 on member 41 provide one group of capacitors with the plates 50 on mass 46, and that the plates 45 on member 42 provide a second group of capacitors in conjunction with the opposing plates 50. There are thus provided two groups of capacitors that are electrically connected in parallel to provide twice the electrical capacity that one group alone would furnish.

In order to provide an electrical connection to the capacitor groups formed by the plates 45 and 50 without directly contacting the plates, a capacitor pick-up plate 55 is mounted within the casing circumferentially with respect to the annular members 41, 42 and the seismic mass 46, and in electric capacitive relationship to the members. The pick-up is supported within the casing by annular insulating rings 56 having inwardly extending shoulders 57 thereon. A sleeve 58 of insulating material surrounds the pick-off plate 55 and insulates it from the wall of the casing. An electrical connection is provided to the capacitor pick-up 55 through a coaxial cable terminal 59. The outer shield of the terminal or the casing itself may provide a return connection for the device. Insulating spacers 60 and 61 insulate the members 41, 42 from the casing, and additional insulating members 62, 63 separate the members from the seismic mass. The entire rotating assembly of the torsiograph is held within the casing by the radial flanges 64 provided on the end plates of the casing.

In operation, the members 41 and 42 which are insulated from, but rigidly secured to the shaft 35, rotate with the shaft as does the seismic mass 46 which is resiliently supported by the shaft. Since the members 41 and 42 are rigidly secured to the shaft their movements will follow the torsional vibrations to which the shaft is subjected. The seismic mass 46, however, will tend to rotate at a relatively constant velocity due to its high inertia. As a result, the spacing between the plates 45 and 50 will vary resulting in a change of electrical capacity between the plates. A relatively fixed capacitance exists between the members 41 and 42 and the capacitor pick-off plate 55. The variations in capacity due to the torsional vibrations are transmitted through the coaxial cable connection 59 to suitable electronic metering apparatus.

Referring now to Figures 5, 6, 7 and 8, a preferred embodiment of the present invention includes a cylindrical outer casing 70 having end plates 71, 72 secured thereto by screws 73. Anti-friction bearings 74 provided in the end plates rotatably support a shaft 76 on which a coupler or adaptor 77 is integrally formed adjacent one end thereof.

An electrically conductive annular member 80 having equally spaced radially extending bosses or projections 81 of preferably rectangular cross-section around its outer periphery is rigidly secured to the shaft by a key 82. A seismic or high inertia mass 84, which may also be of conductive material, is supported on the shaft 76 by an anti-friction bearing 85, and is further resiliently coupled to the shaft through a pair of flexible resilient members 86 that abut adjustable stops 87 on a viscous damper 88 in the form of a disc keyed to the shaft 76 in close proximity to the seismic mass 84. A suitable viscous material such as silicone grease may be inserted in the spacing 89 between the viscous damper 88 and the seismic mass 84 through which sudden non-recurrent vibrations are transmitted to the seismic mass. Mechanical stops 90 are secured to the viscous damper by screws 91 or other suitable means and extend radially outwardly from the damper into openings 92 provided in the seismic mass. Screws 93 are provided on the stops to control the extent of relative movement of the seismic mass with respect to the shaft.

The seismic mass 84 is provided with a sleeve 94 of nylon or other suitable insulating material to which is secured an electrically conductive ring 95 having a portion 96 extending axially beyond the end of the sesmic mass to encompass the annular member 80. The extending portion 96 of the ring 95 is provided on its inner surface with a plurality of equally spaced inwardly extending bosses 97 of preferably rectangular cross-section. The bosses 97 overlie the bosses 81 of member 80 and form therewith the opposed plates of a variable electric capacitor.

To provide an electrical connection to the bosses 81 and 97, a capacitive pick-off member 100 of conductive material is supported within the casing 70 circumferentially with respect to the annular member 80 and the ring 95 and in electrical capacitive relationship thereto. A sleeve 101 on the pick-off member 100 insulates the member from the casing. A connector 103 affixed to the casing provides a direct electrical connection through lead 104 to a radial flange 105 on the capacitive pick-off member 100.

The shaft 76 of the torsiograph is provided with a circumferential groove 107 into which a brush 108 of carbon or other suitable conductive material extends. An electrical connection is made to the brush through a terminal 109 and a spring 110 that resiliently urges the brush into the groove. The terminal and brush provide a means for grounding or discharging any static charges that build up in the torsiograph during its operation.

An opening 112 in the casing 70 is provided with a calibration locking screw support 113 having an aperture 114 extending therethrough. A further aperture 115 in the seismic mass 84 is capable of being aligned with the aperture 114 in the calibration screw support 113. Referring now to Figure 9, means for facilitating the static calibration of the torsiograph in accordance with the present invention includes a locking screw 116 that passes through the aperture 114 and extends into the aperture 115 in the seismic mass to lock the mass to the casing and prevent relative rotation therebetween. Calibration marks or indicia 118 in angular degrees are provided on the end plate 72 of the casing. A pointer 117 associated with the indicia 118 is secured to the adaptor 77 on shaft 76 by bolts 119.

Since the seismic mass is locked to the casing, manual rotation of the shaft 76 causes a variation in capacity of the torsiograph to effect suitable metering apparatus to which the device is connected as shown in Figure 1, and the extent to which the shaft has been rotated relative to the seismic mass will be indicated by the pointer 117 on the indicia 118. It is thus seen that a simple means for calibrating the variation of capacity of the torsiograph with respect to the angular rotation of the shaft 76 relative to the mass 84 has been provided.

To provide a synchronizing pulse for each revolution of the shaft 76 and thereby provide means for correlating the angular rotation of the shaft with respect to a reference point on the shaft, a magnetic plug 121 is carried by the seismic mass. A magnetic pick-up which may, for example, include a permanent magnet and a coil to which a suitable connection can be made, may be inserted in the opening 112 in lieu of the calibration screw support 113. For each revolution of the shaft 76 the magnetic plug 121 passes the magnetic pick-up to generate a synchronizing pulse in the coil of the pick-up.

The operation of the preferred embodiment of the invention is similar to that described above with reference to Figures 2, 3 and 4, except that the relative movement between the shaft 76 and the seismic mass 84 changes the relative area of the bosses or capacitor plates rather than changing the spacing between the plates. This provides a more sensitive arrangement. In the preferred embodiment, the viscous damper 88 prevents sudden non-recurrent vibrations of the shaft from causing relative movement between the seismic mass and the shaft. Accordingly, there is no relative displacement between the capacitor plates carried by the seismic mass and those carried by the annular disc 81, and therefore no variation in capacity output of the torsiograph due to these non-recurrent vibrations. Prior to assembling the torsiograph, the seismic mass may be positioned or pre-set with respect to the viscous damper 88 and the shaft 76 by adjustment of the stops 87 against which the resilient members 86 abut. Thus the capacity of the torsiograph which is dependent upon effective area between the bosses or capacitor plates may be initially determined.

Referring now to Figure 10, the electronic metering apparatus particularly suitable for use with the torsiograph of the present invention includes a high voltage power supply generally indicated at 130, an oscillator stage 131, a detector stage 132, and a peak reading circuit 133.

The rectifier stage 130 includes a high voltage step-up transformer 135 having a pair of primary windings 136, 137, a high voltage secondary winding 138 and a plurality of filament supply windings 139. A fuse 141 and power switch 142 are connected in circuit with the primary windings of the transformer. A full wave rectifier tube 143 has its filaments 144 connected to one of the filament supply windings 139 and its anodes 145 connected to the end terminals 146 of the secondary winding 138. A direct current path is provided between the rectifier filaments 144 and anodes 145 from a centertap 148 on winding 138 through conductors 149, 150, bleeder resistor 151, potentiometer 152, and choke 153 of the D.C. filter 154. In addition to the choke 153, filter 154 is provided with shunt capacitors 155. Voltage regulator tubes 156 and 157 connected between the potentiometer 152 and the conductor 150 provide, to conductor 159, a constant output voltage from the power supply, the magnitude of which is determined by the setting of the potentiometer 152.

The oscillator circuit 131 includes a vacuum tube 160 having at least a plate 161, a screen grid 162, control grid 163 and cathode 164. Operating potentials are applied to the anode 161 through a radio frequency choke 166 and are applied to the screen grid through resistor 167 and by-pass capacitor 168. The oscillator is of the tuned plate type wherein the plate 161 is connected through variable capacitor 170 to a tunable circuit including the inductor 171, a fixed capacitor 172, and the variable capacitor of the torsiograph of the present invention indicated by dotted lines at 173, which coincide with the input terminals to the metering apparatus. The inductor 171 is coupled to the inductor 174 in the cathode-grid circuit of oscillator tube 160 to provide regenerative feed back in the oscillator circuit to sustain oscillations, the amplitude of which is proportional to the capacity 173 of the torsiograph. Grid leak resistor 176 provides a suitable biasing potential for the oscillator tube 160.

The detector circuit 132 includes a triode vacuum tube 180 having an anode 181, a control grid 182 and a cathode 183. A D.C. milliammeter 184 is connected in series with the cathode bias resistor 185 to indicate the average D.C. current flowing through the detector tube 180. Output terminals 186 provide means for connecting the detector stage of the metering apparatus to the oscilloscope 26 of Figure 1.

To indicate the peak amplitude of oscillations which correspond to the peak values of torsional vibrations picked up by the subject torsiograph, the peak reading circuit 133 of the metering apparatus is connected through conductor 188 to the cathode 183 of detector 180. The peak reading circuit includes a rectifier 190 that is connected in series with the conductor 188 and coupled through potentiometer 191 and resistor 192 to one control grid 193 of a pair of parallel arranged triode vacuum tubes 194 and 195. A resistor 196 and potentiometer 197 connected between conductors 150 and 159 form a voltage divider to which the control grid 198 of tube 195 is connected. A peak reading meter 200 of the D.C. microammeter type, which is preferably calibrated in angular degrees, is connected with current limiting resistor 201 between the cathodes 202 and 203 of tubes 194 and 195, respectively. Meter 200 indicates any difference in potential between the cathodes 202 and 203 resulting in a difference in voltage drop across the cathode resistors 204 and 205 that are connected between the cathodes 202 and 203 and the conductor 150. It is thus seen that the peak reading meter 200 is not responsive to the average current flowing through the tubes 194, 195 but only to a difference in the current flow through the two tubes. By adjusting the potentiometers 191 and 197 and thereby controlling the bias grids 193 and 198, the current flow through tubes 194 and 195 may be equalized. This adjustment of the potentiometers is made prior to the commencement of a torsional vibration test or, in other words, when the capacity of the torsiograph of the present invention as indicated at 173 is of constant value. There will then be no indication or a null indication on the meter 200. Upon commencement of the test, torsional vibrations as picked up by the torsiograph result in variations of capacity at 173, a variation in the output of the oscillator stage 131 and the detector stage 132 and a change in bias on the grid 193 of tube 194. Accordingly, a change in current through tube 194 results, causing a change in voltage drop across the resistor 204. This change in voltage drop across resistor 204 relative to the fixed voltage drop across resistor 205 is indicated on meter 200 and is proportional to the peak amplitudes of vibration to which the torsiograph is subjected.

There has been described an improved electrostatic seismic mass type torsiograph wherein variations in torsional vibrations are converted into changes in the electrical capacity of the torsiograph. The changes in electrical capacity control the output of an oscillator and detector stage and are indicated on a meter in terms of the angular displacement between the seismic mass of the torsiograph and the shaft or rotating member under test. The variations in electrical capacity may result from the relative displacement of the capacitor plates of the torsiograph or, preferably, may be due to a change in the effective area of the capacitor plates.

There has further been described a viscous damping means for preventing the torsiograph from being sensitive to torsional vibrations other than those of the recurring type. In a preferred embodiment of the invention a grounding means is provided for withdrawing any static charges which may be built up in the torsiograph during a test run. Finally, a simple method of calibrating the torsiograph has been provided wherein the seismic mass of the torsiograph may be locked to the casing, and the shaft of the torsiograph manually rotated to correlate the variation of capacity of the torsiograph with the rotation of the shaft relative to the seismic mass.

What is claimed is:

1. A torsional vibration measuring device comprising a casing, a shaft supported for axial rotational movement within said casing, a first electrically conductive member resiliently mounted on said shaft for predetermined relative movement with respect to said shaft, a second electrically conductive member rigidly secured to said shaft for movement therewith, said second member being in electrical capacitive relationship with said first member, means for locking said first member to said casing, means for rotating said shaft and said second member with respect to said casing and said first member, a pointer fixed to said shaft being cooperable with calibration means on said casing for indicating the relative movement of said second member with respect to said first member whereby the angular displacement between said members may be correlated with the variation in electrical capacity between said members.

2. A device for measuring torsional vibrations comprising a rotatable shaft, an electrically conductive member rigidly secured to said shaft, a support member rigidly secured to said shaft, an antifriction bearing supported by said shaft intermediate said members, a high inertia mass including a conductive portion carried by said bearing and said support member, means resiliently coupling said mass to said support member, and said conductive member and said conductive portion of said mass providing an electrical capacitive connection.

3. A device for measuring torsional vibrations comprising a rotatable shaft, an electrically conductive annular member keyed to said shaft adjacent one end thereof, an annular disk secured to said shaft adjacent the other end thereof, an antifriction bearing supported by said shaft intermediate said member and said disk, a high inertia mass including a conductive portion carried by said bearing in close proximity to said annular member to provide an electrical capacitive relationship, means resiliently coupling said mass to said disk, and means providing a viscous coupling between said mass and said disk.

4. A device for measuring torsional vibrations comprising a rotatable shaft, an electrically conductive annular member keyed to said shaft adjacent one end thereof, an annular support disk secured to said shaft adjacent the other end thereof, an antifriction bearing supported by said shaft intermediate said member and said disk, a high inertia mass including a conductive portion carried by said bearing and said support disk, means resiliently coupling said mass to said disk, said member and said conductive portion of said mass closely spaced from one another in electrical capacitive relationship.

5. A device for measuring torsional vibrations comprising a casing, a shaft supported for axial rotational movement within said casing, an electrically conductive member rigidly secured to said shaft, a support member rigidly secured to said shaft, an antifriction bearing supported by said shaft intermediate said members, a high inertia mass including a conductive portion carried by said bearing and said support member, means resiliently coupling said mass to said further member, said conductive member and said conductive portion of said mass being closely spaced in electrical capacitive relationship, a magnetic element carried by said mass for rotation therewith, and means on said casing for supporting an electromagnetic pick-up within the casing adjacent the path of said element.

6. A device for measuring torsional vibrations comprising a casing, a shaft supported for axial rotational movement within said casing, an electrically conductive member rigidly secured to said shaft, a support member rigidly secured to said shaft, an antifriction bearing supported by said shaft intermediate said members, a high inertia mass including a conductive portion carried by said bearing and said support member, means resiliently coupling said mass to said support member, said conductive member and said conductive portion of said mass being closely spaced in electrical capacitive relationship, means for locking said high inertia mass to said casing, means for rotating said shaft and said members with respect to said casing and said mass, indicator means fixed to said shaft cooperable with calibration means on said casing for indicating the relative movement of said members with respect to said mass whereby the annular displacement between said members may be correlated with the variation in electrical capacity between said conductive member and said conductive portion of said mass.

7. A device for measuring torsional vibrations as defined by claim 6 wherein a viscous material is interposed between said support member and said high inertia mass to provide a viscous coupling between said support member and said mass.

8. A device for measuring torsional vibrations comprising a generally cylindrical casing, end plates secured to said casing, antifriction bearings supported by each end plate, a shaft rotatably supported by said bearings, an electrically conductive annular member keyed to said shaft adjacent one of said end plates, said member having on its outer periphery a plurality of equally spaced radially extending bosses of substantially rectangular cross-section, an annular disk keyed to said shaft adjacent the other of said end plates, a further antifriction bearing supported by said shaft intermediate said annular member and said disk, a high inertia mass supported by said further bearing in close proximity to said disk, means resiliently coupling said mass to said disk, a viscous material interposed between said disk and said mass, a first electrically conductive ring secured to said mass and insulated therefrom, said ring having a portion extending axially beyond said mass and encompassing said annular member, inwardly extending bosses of substantially rectangular cross-section equally spaced about the inner periphery of said portion of said ring and being in electrical capacitive relationship with said bosses on said annular member, a further conductive ring insulated from and supported within said casing circumferentially with respect to said first ring and in electrical capacitive relationship thereto and means providing an electrical connection to said further conductive ring.

9. A torsional vibration measuring device comprising a shaft supported for axial rotational movement, a first electrically conductive annular member rigidly secured to said shaft, a second annular electrically conductive member radially outwardly spaced in variable electrical capacitive relationship with said first annular member, said second member insulated from and resiliently connected to said shaft at a point axially spaced from said first annular member, said second member also movably supported intermediate said point and said first annular member, and a third annular electrical conductive member radially outwardly spaced from said second annular member in electrical capacitive relationship.

10. A device for measuring torsional vibrations comprising a rotatable shaft, a first electrically conductive member rigidly secured to said shaft, a support member axially spaced from said first conductive member and rigidly secured to said shaft, an antifriction bearing supported by said shaft intermediate said members, a high inertia mass including an insulated conductive portion carried by said bearing and said support member, means resiliently coupling said mass to said support member, said conductive portion being supported adjacent said first member in variable electrical capacitive relationship, a third conductive member circumferentially supported and radially spaced from said conductive portion in variable electrical capacitive relationship, and means providing an electrical connection to said third member whereby an electrical capacitive relationship is established between said first and third members which is varied by deflection of the inertia mass.

References Cited in the file of this patent

UNITED STATES PATENTS

| | | |
|---|---|---|
| 1,568,544 | Chilton et al. | Jan. 5, 1926 |
| 2,063,790 | Carbonara | Dec. 8, 1936 |
| 2,397,935 | Gardiner et al. | Apr. 9, 1946 |
| 2,409,876 | Martin et al. | Oct. 22, 1946 |
| 2,612,773 | Beadle | Oct. 7, 1952 |
| 2,760,127 | Duncan et al. | Aug. 21, 1956 |

FOREIGN PATENTS

| | | |
|---|---|---|
| 201,985 | Great Britain | Aug. 1, 1923 |
| 470,454 | Germany | Jan. 15, 1929 |
| 892,358 | France | Jan. 7, 1944 |